United States Patent
Siegel et al.

[11] Patent Number: 5,819,363
[45] Date of Patent: Oct. 13, 1998

[54] WINDSHIELD WIPER FOR A WINDOW WITH A CONSTANT RADIUS OF CURVATURE

[75] Inventors: Gunter Siegel, Horb; Alfred Ott, Gäufelden; Michael Kelz, Aidlingen, all of Germany

[73] Assignee: Mercedes-Benz AG, Stuttgart, Germany

[21] Appl. No.: 564,958

[22] Filed: Nov. 30, 1995

[30] Foreign Application Priority Data

Nov. 30, 1994 [DE] Germany ............... 44 42 527.9

[51] Int. Cl.⁶ ............................................. B60S 1/32
[52] U.S. Cl. ................. 15/250.351; 15/230.352; 15/350.21
[58] Field of Search ............ 15/250.351, 250.352, 15/250.202, 250.34, 250.3, 250.31, 250.002, 250.003, 250.18, 250.04, 250.21

[56] References Cited

U.S. PATENT DOCUMENTS

| | | | |
|---|---|---|---|
| 1,456,316 | 5/1923 | Kritz | 15/250.3 |
| 1,573,618 | 2/1926 | Laganke | 15/250.351 |
| 1,658,389 | 2/1928 | Oishei | 15/250.3 |
| 2,031,297 | 2/1936 | Anderson | 15/250.351 |
| 2,795,809 | 6/1957 | Vischulis, Jr. | 15/250.21 |
| 3,387,316 | 6/1968 | Pearse | 15/250.351 |
| 3,832,751 | 9/1974 | Ursel et al. | 15/250.23 |

FOREIGN PATENT DOCUMENTS

| | | |
|---|---|---|
| 0299708 | 1/1989 | European Pat. Off. . |
| 2 169 698 | 9/1973 | France . |
| 2 207 475 | 6/1974 | France . |
| 2364622 | 7/1974 | Germany . |
| 3824489A1 | 1/1990 | Germany . |
| 4142163 | 7/1992 | Germany ............ 15/250.351 |
| UA62-77063 | 5/1987 | Japan . |
| A6270770 | 9/1994 | Japan . |
| 839922 | 6/1960 | United Kingdom . |

Primary Examiner—Gary K. Graham
Attorney, Agent, or Firm—Evenson, McKeown, Edwards & Lenahan P.L.L.C.

[57] ABSTRACT

A windshield wiper is provided for a window with a constant radius of curvature. The wiper axis is aligned along a radius with respect to the center of curvature of the window. The wiper arm and the rotatable wiper-bearing part are connected together as a rigid constructional unit. The wiper bearing and/or the wiper arm adjacent the wiper bearing are provided with elastic portions or elements to accommodate movement of the wiper arm in a direction parallel to the wiper axis.

1 Claim, 3 Drawing Sheets

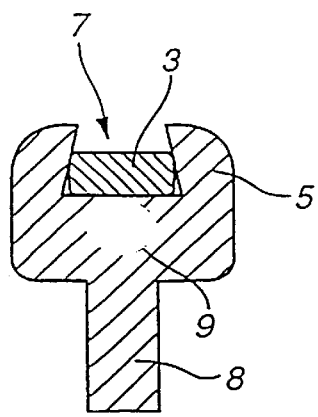
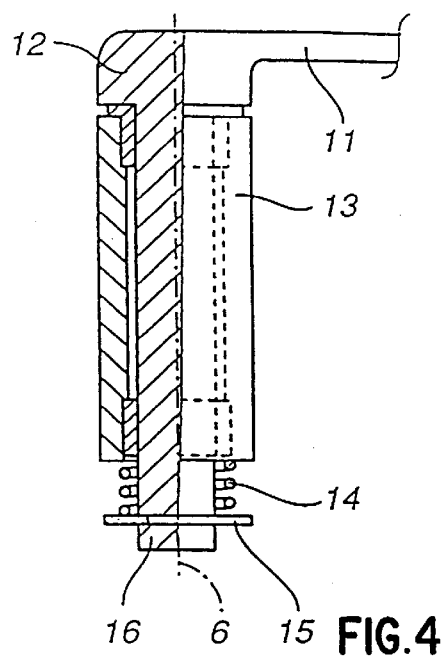
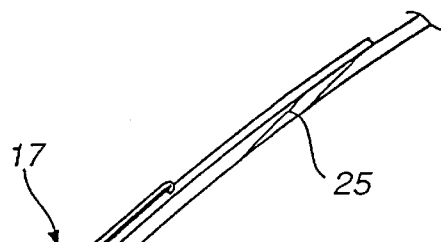
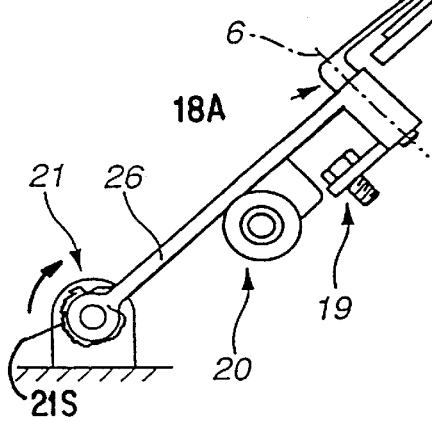
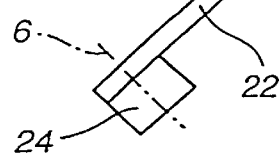

WINDSHIELD WIPER FOR A WINDOW WITH A CONSTANT RADIUS OF CURVATURE

BACKGROUND AND SUMMARY OF THE INVENTION

The invention relates to a windshield wiper for a window with a constant radius of curvature, in particular for a motor vehicle window in the shape of a segment of a sphere, having a wiper arm which can be pivoted about a wiper axis of a wiper bearing and to which a wiper blade is assigned, and having means for pressing the wiper blade against the window.

German Patent Document DE OE 23 64 622 discloses a wind-shield wiper, the wiper arm of which has a wiper blade support, which supports the wiper blade, and a spring arm which holds the wiper-blade support and can be connected to a hub part which can be connected to the wiper-bearing shaft. The spring arm applies the pretension necessary in order to press the wiper-blade support and the wiper blade against the window.

An object of the invention is to provide a windshield wiper which is of the general type mentioned above which can be manufactured simply and cost-effectively.

This object is achieved according to preferred embodiments of the invention in that the wiper axis is aligned along a radius with respect to the center of curvature of the window, in that the wiper arm and a wiper-bearing part, which is mounted rotatably in the wiper bearing, are connected to one another to form a rigid constructional unit, and in that the wiper arm is movable axially in an elastic manner essentially parallel to the wiper axis. By connecting the wiper-bearing part and wiper arm to form a rigid constructional unit a substantially simplified windshield wiper is obtained compared to conventional windshield wipers since the known windshield wipers require a plurality of joint and spring parts to join the wiper arm to the wiper bearing. The windshield wiper according to the invention can therefore be manufactured considerably more cost effectively than known windshield wipers.

In a development of certain preferred embodiments of the invention the wiper arm is in one piece and the material of the wiper arm is weakened in an elastically flexible manner in a region directly adjacent to the wiper axis. This weakened region replaces the joint which is present in known windshield wipers in order to obtain an adequate contact pressure of the wiper arm on the window.

In a further development of certain preferred embodiments of the invention the wiper-bearing part is held in the wiper bearing such that it is movable axially in a spring-loaded manner. Since the wiper arm and the wiper-bearing part form a rigid constructional unit the contact pressure of the wiper arm is obtained in a simple manner by axially spring-loading the wiper-bearing part.

In a further development of certain preferred embodiments of the invention the wiper arm and the wiper-bearing part are manufactured as a common, one-piece component. The windshield wiper is further simplified as a result.

In a further development of certain preferred embodiments of the invention the wiper blade is connected in one piece to the wiper arm. The windshield wiper is thus further simplified and the cost reduced.

In a further development certain preferred embodiments of the invention the windshield wiper is arranged on a pivotable plate which is loaded by means of a spring which is effective in the direction of the window. As a result, the entire wiper system can be pivoted simply in a spring-loaded manner about a rotational axis.

Other objects, advantages and novel features of the present invention will become apparent from the following detailed description of the invention when considered in conjunction with the accompanying drawings.

BRIEF DESCRIPTION OF THE DRAWINGS

FIG. 3 shows a section through the windshield wiper according to FIG. 1, along the section line III-III in FIG. 1;

FIG. 4 shows the mounting of a further embodiment of a windshield wiper according to the invention, in the region of the wiper axis;

FIG. 5 shows diagrammatically a further embodiment of a windshield wiper according to the invention which is arranged, together with the remaining parts of the wiper system, on a plate which can be pivoted about a stationary rotational axis;

FIG. 6 shows diagrammatically a further embodiment of a windshield wiper according to the invention, which is designed as a one-piece component, the wiper blade being connected over its entire length directly to the wiper arm.

DETAILED DESCRIPTION OF THE INVENTION

Figure 1:
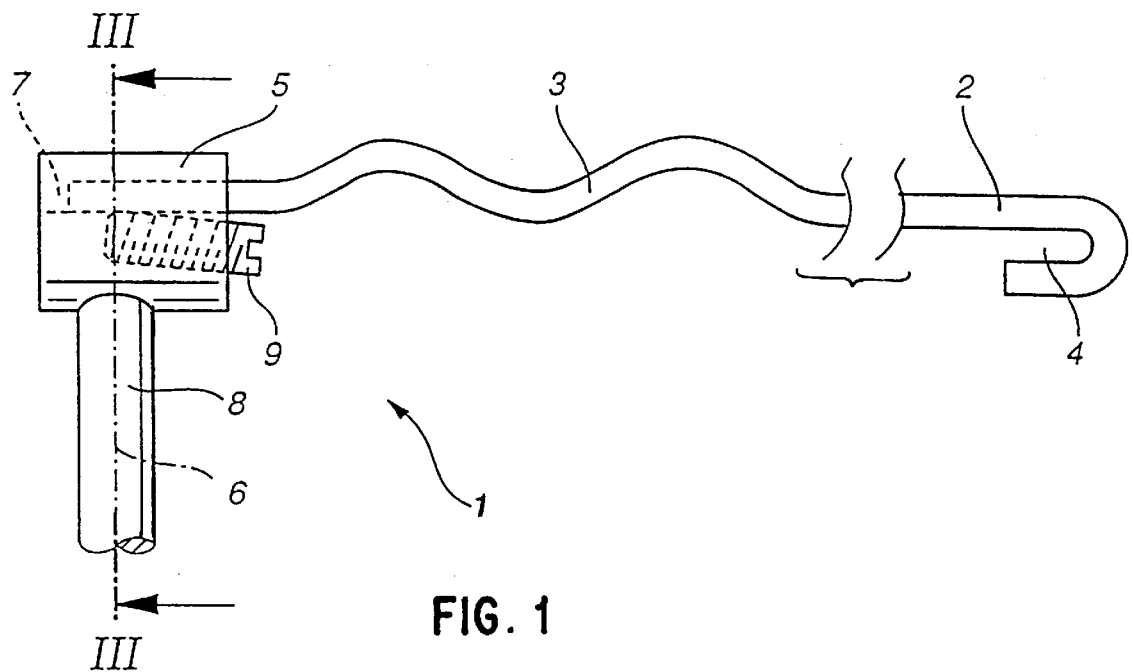
FIG. 1 shows a side view of an embodiment of a windshield wiper according to the invention, the wiper arm of which is provided with a weakened region which is directly adjacent to the wiper axis.

A windshield wiper (1) according to FIG. 1 has a wiper arm (2, 3) which is manufactured from a spring steel plate. At its free end, the wiper arm (2, 3) has a curved hook (4) on which a wiper-blade support can be secured. At its end opposite the curved hook (4) the wiper arm is inserted into a groove (7) in a wiper bearing part (5) and is fixed rigidly therein by means of a headless screw (9). The wiper arm (2, 3) protrudes transversely from the wiper-bearing part (5) and hence radially with respect to a wiper axis (6) since the wiper-bearing part (5) has, as an extension, a wiper bearing shaft (8) which is coaxial with respect to the wiper axis (6). Wiper bearing shaft 8 is held rotatably in a corresponding bush in a manner which is not shown in detail, in a wiper bearing and can be pivoted to and fro by means of a drive device. In a region which adjoins the wiper axis (6) and hence the wiper-bearing part (5), the wiper arm (2, 3) has a corrugation (3) which makes the wiper arm (2, 3) more unstable (less rigid) in this region than over its remaining length. The wiper arm (2, 3) is therefore elastically flexible in this region rather than rigid. The region (3) has the function of a joint. The wiper arm (2, 3) can therefore yield in the region of the corrugation (3) in the direction of the window as soon as a wiper-blade support with a wiper blade is fitted on the curved hook (4).

Figure 2:
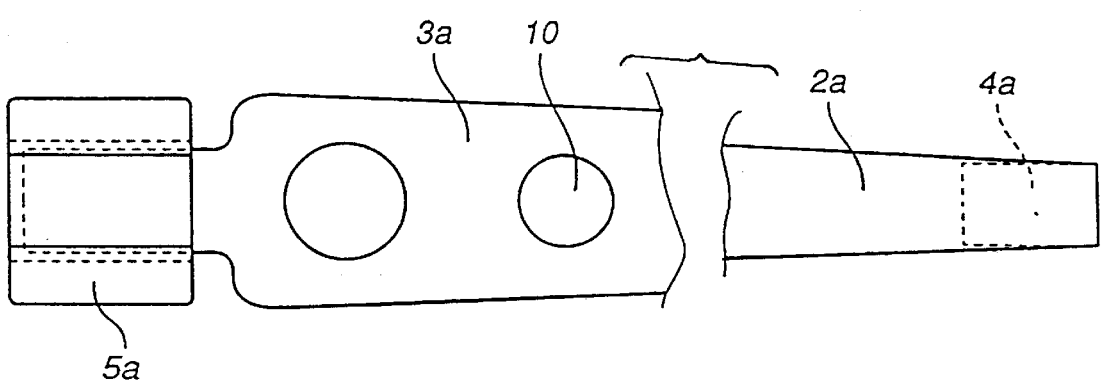
FIG. 2 shows a plan view of a further embodiment of a windshield wiper according to the invention, the wiper arm of which has a region which is weakened by perforations and is adjacent to the wiper axis.

In place of a corrugation, in the case of the windshield wiper according to FIG. 2 the same function is obtained by means of a perforated region (3a) of the wiper arm (2a, 3a). In this arrangement, a plurality of punched holes (10) are provided in the region (3a). Weakening of the material, i.e. of the spring steel plate, in this region results in increased flexibility which, as also in the case of the exemplary embodiment according to FIG. 1, produces a joint function for the wiper arm (2a, 3a). The wiper arm (2a, 3a), like the windshield wiper (1) according to FIGS. 1 and 3, is also fixed rigidly in a wiper-bearing part (5a).

A windshield wiper according to FIG. 4 has a wiper arm (11) which merges in one piece into a wiper bearing part (12) in the form of a hub, the hub extension (16) serving as the wiper-bearing shaft. The hub extension (16) can be rotated coaxially with respect to the wiper axis (6) in a stationary wiper-bearing sleeve (13). The wiper arm (11) and hence also the hub extension (16) are mounted in the wiper-bearing sleeve (13) in a manner such that they are movable axially with respect to the wiper axis (6). The hub extension (16) is spring-loaded in the axial direction, axial flexibility of the wiper arm (11) thereby being achieved. For this purpose a helical spring (14) which is designed as a compression spring is supported, on the one hand, on a lower end edge of the stationary wiper-bearing sleeve (13) and, on the other hand, on a retaining ring (15) fixed axially on the hub extension (16). It is therefore possible for the wiper arm (11) to move axially counter to the force of the helical spring (14).

All of the windshield wipers described are provided for wiping a window with a constant radius of curvature, a window designed as a spherical segment or a window with an infinite radius of curvature, i.e. a flat window. The wiper axes (6) of the windshield wipers in each case are disposed on a radius with respect to the center of curvature of the window curvature, and in the case of a plane, flat window the wiper axis runs perpendicularly with respect to this window. Since the radius of curvature of the window does not change, it is possible to design the windshield wipers in the simple manner described here.

Also, the case of the exemplary embodiment according to FIG. 5, a windshield wiper (17) is provided for wiping a motor vehicle window (25) in the shape of a segment of a sphere. In this arrangement, the windshield wiper (17) is of a corresponding design to the windshield wiper according to FIG. 4 and, including its wiper bearing (18), is held on a plate (26) which is mounted such that it can be pivoted towards the window and away from the window (25) about a pivot axis (21) fixed on the vehicle. On the plate (26) there is additionally provided a wiper-arm motor, for driving the windshield wiper (17), as well as a fastening and adjusting screw (19) for adjusting the contact pressure of the wiper arm relative to the window (25). This fastening and adjusting screw (19) is used to adjust the spring force of the axial spring at the wiper bearing (18) (similar to FIG. 4) in a simple manner. In addition, the fastening and the adjusting screw (19) serves to fix the wiper bearing on the plate (26). The plate (26) is spring loaded by spring (21S) about the rotational axis (21) in the direction of the arrow so as to exert the necessary contact pressure on the entire wiper system and hence also on the wiper arm (17) relative to the window (25).

The windshield wiper according to FIG. 6 is a particularly simple embodiment since it is simply a one piece component, preferably made of plastic. The wiper bearing part (24) and the wiper arm (22) are manufactured in one piece. The wiper-rubber profile (23), which serves as the wiper blade, is connected over its entire length directly to the wiper arm (22). The windshield wiper can be pivoted about the wiper axis (6) which is on a radius with respect to the center of curvature of the window to be wiped (not shown).

Figure 7:
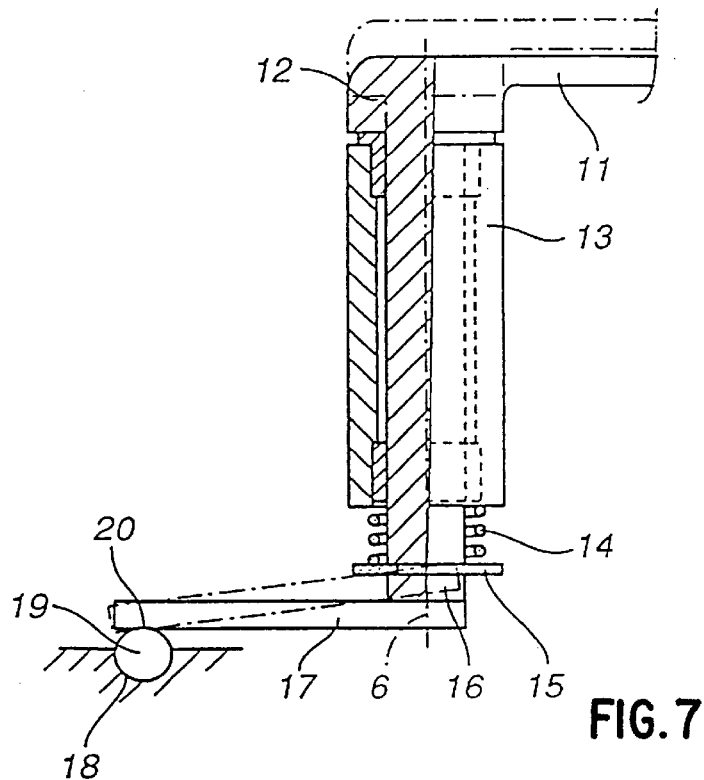
FIG. 7 shows a further embodiment similar to FIG. 4, in which the axial motion of the wiper arm is controlled by a cam path.
Figure 8:
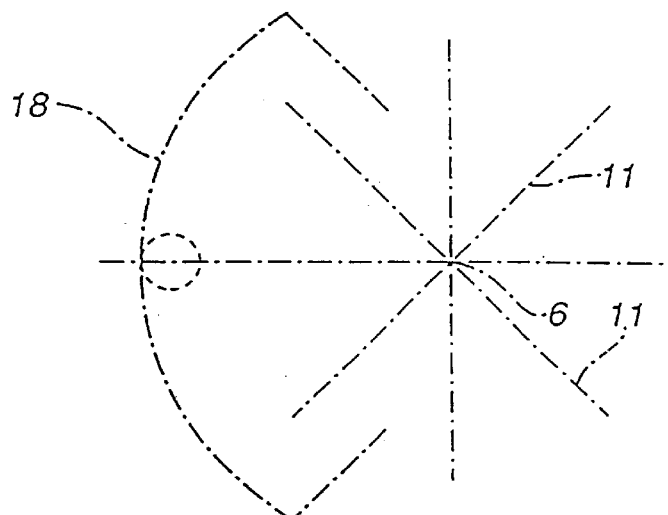
FIG. 8 shows diagrammatically a plan view of the wiping motion of the wiper arm according to FIG. 7.
Figure 9:
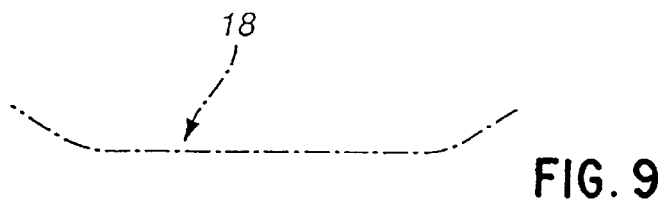
FIG. 9 show the slotted guide, which serves as the cam path, according to FIGS. 7 and 8, in its true size.

In order to reduce the contact pressure of a wiper arm (11) corresponding to FIG. 4, in its two reversal positions and hence to make possible simplified turning over of the wiper lip of the wiper blade, the windshield wiper according to FIGS. 7 to 9 is additionally provided with a cam path (18) which adjusts the wiper arm (11) in the axial direction. As can be seen from FIG. 9, the cam path, which is designed as a slotted guide (18), rises in a sloping manner towards its two end points, i.e. at the reversal positions of the wiper arm (11). A rigid lever extension (17) protrudes laterally from the wiper-bearing part (12, 16) of the wiper arm (11) and is supported at a point (20) on a guide ball (19) which runs in the slotted guide (18). The slotted guide (18) is arranged in a stationary manner around the wiper bearing and concentrically with respect to the wiper axis (6). It is curved corresponding to an arc of a circle, the traversed angle of which corresponds to the maximum pivot angle of the wiper arm (11) going to and fro.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Windshield wiper assembly for a motor vehicle windshield, comprising:

a wiper bearing part supported in a wiper bearing for pivotal movement about a fixed wiper axis, a wiper arm connected to the wiper bearing part to form a rigid constructional unit, said wiper arm being configured to directly support a wiper blade which in use engages a windshield surface, and elastic structure, said elastic structure including a weakened section formed by holes through the wiper arm, said elastic structure located near its connection with the wiper bearing part, said weakened section being more elastically yieldable than portions of said wiper arm located radially outward thereof with respect to the wiper axis, said radially outward portions serving to hold a wiper blade which in use contacts the windshield to wipe same accommodating movement of at least portions of the wiper arm in a direction parallel to said wiper axis.

* * * * *